US012482991B2

(12) United States Patent
Liu et al.

(10) Patent No.: US 12,482,991 B2
(45) Date of Patent: Nov. 25, 2025

(54) ELECTRICAL CONNECTOR

(71) Applicant: Cheng Uei Precision Industry Co., LTD., New Taipei (TW)

(72) Inventors: Xu Liu, Dong-Guan (CN); Bin Wang, Dong-Guan (CN); Ting-Feng Liao, New Taipei (TW)

(73) Assignee: CHENG UEI PRECISION INDUSTRY CO., LTD., New Taipei (TW)

(*) Notice: Subject to any disclaimer, the term of this patent is extended or adjusted under 35 U.S.C. 154(b) by 316 days.

(21) Appl. No.: 18/367,455

(22) Filed: Sep. 12, 2023

(65) Prior Publication Data

US 2024/0146002 A1 May 2, 2024

(30) Foreign Application Priority Data

Nov. 2, 2022 (CN) ......................... 202222917244.9

(51) Int. Cl.
*H01R 13/6582* (2011.01)
*H01R 13/514* (2006.01)
*H01R 13/516* (2006.01)

(52) U.S. Cl.
CPC ....... *H01R 13/6582* (2013.01); *H01R 13/514* (2013.01); *H01R 13/516* (2013.01)

(58) Field of Classification Search
CPC . H01R 13/6582; H01R 13/514; H01R 13/516
See application file for complete search history.

(56) References Cited

U.S. PATENT DOCUMENTS

2022/0131308 A1* 4/2022 Lin ........................ H01R 31/06
2022/0285889 A1* 9/2022 Chen .................... H01R 13/514

* cited by examiner

*Primary Examiner* — Sean Gugger
(74) *Attorney, Agent, or Firm* — Cheng-Ju Chiang

(57) ABSTRACT

An electrical connector includes an insulating housing, a plurality of first terminals, a plurality of second terminals, a metal element and a fastening assembly. The insulating housing has a first insulating body, a second insulating body surrounding the first insulating body, a third insulating body and a fourth insulating body. The third insulating body is disposed to a rear end of a top surface of the first insulating body. The fourth insulating body is disposed to a top surface of the third insulating body. The plurality of the first terminals are surrounded by the first insulating body and the second insulating body. The plurality of the second terminals are surrounded by the third insulating body. The metal element is disposed to an outer surface of the insulating housing. The fastening assembly is positioned above the fourth insulating body.

20 Claims, 17 Drawing Sheets

ELECTRICAL CONNECTOR

CROSS-REFERENCE TO RELATED APPLICATION

The present application is based on, and claims priority from, China Patent Application No. 202222917244.9, filed Nov. 2, 2022, the disclosure of which is hereby incorporated by reference herein in its entirety.

BACKGROUND OF THE INVENTION

1. Field of the Invention

The present invention generally relates to an electrical connector, and more particularly to an electrical connector that is able to be used as a plug and a socket simultaneously, and the electrical connector having a better structure strength.

2. The Related Art

Generally, existing electrical connectors are usually divided into plugs and sockets, and the plug and the socket are connected to each other. Nonetheless, the electrical connectors which are the plugs and the sockets have different structures, so different molds are needed for manufacturing the plugs and the sockets, and correspondingly, manufacturing costs of the plugs and the sockets are increased. Moreover, the electrical connectors are divided into the plugs and the sockets, when the electrical connectors are maintained, different kinds of the plugs and the sockets need purchasing, and the electrical connectors are replaced by the different kinds of the plugs and the sockets, so costs and working hours of maintaining the electrical connectors are increased. At the same time, a user needs to check the plug and the socket to complete a connection, so the electrical connectors have a usage complexity.

A conventional electrical connector includes an insulating body, a plurality of first terminals and a plurality of second terminals. The insulating body includes a first insulating body, a second insulating body and a third insulating body. The second insulating body is disposed to a rear end of the first insulating body. The rear end of the first insulating body has an accommodating groove. The second insulating body is mounted in the accommodating groove. The first insulating body has a plurality of first terminal grooves. Several portions of a top surface of the second insulating body are recessed downward to form a plurality of second terminal grooves. The third insulating body is mounted on a lower portion of a rear of the second insulating body. The third insulating body has a plurality of third terminal grooves. The plurality of the third terminal grooves are disposed corresponding to the plurality of the second terminal grooves. The plurality of the first terminals are mounted in the plurality of the first terminal grooves. The plurality of the second terminals are mounted in the plurality of the second terminal grooves. Each second terminal has a fastening portion. The fastening portion extends frontward to form a contacting portion. The fastening portion of each second terminal is disposed to one third terminal groove. The contacting portion of each second terminal is disposed to one second terminal groove, and the contacting portion of each second terminal is exposed outside to the one second terminal groove. The contacting portions of the plurality of the second terminals are located above the plurality of the first terminals.

However, the above-mentioned insulating body of the conventional electrical connector merely adopts a plastic material. When the conventional electrical connector is docked, the insulating body of the conventional electrical connector easily causes a dissipation, so a structure strength of the conventional electrical connector is affected. When two conventional electrical connectors are docked, the two conventional electrical connectors are connected to each other by a buckling element. Furthermore, the buckling element requires a longer structure space, and the buckling element also affects the structure strength of the conventional electrical connector.

Thus, it is essential to provide an innovative electrical connector that is able to be used as a plug and a socket simultaneously, and the innovative electrical connector has a better structure strength.

SUMMARY OF THE INVENTION

An object of the present invention is to provide an electrical connector that is able to be used as a plug and a socket simultaneously, and the electrical connector has a better structure strength. The electrical connector includes an insulating housing, a plurality of first terminals, a plurality of second terminals, a metal element and a fastening assembly. The insulating housing has a first insulating body, a second insulating body, a third insulating body and a fourth insulating body. The first insulating body has a first base portion, and a first tongue portion connected with a front end of the first base portion. The second insulating body surrounds the first insulating body. The second insulating body has a second base portion, and a second tongue portion connected with a front end of the second base portion. The first tongue portion is disposed in the second tongue portion. The third insulating body is disposed to a rear end of a top surface of the first insulating body. The third insulating body has a third base portion. The third base portion is located above a rear end of the first base portion. The fourth insulating body is disposed to a top surface of the third insulating body. A front end of the fourth insulating body has a fourth base portion. A top surface of the fourth base portion is flush with a top surface of the first tongue portion and a top surface of the second tongue portion. The fourth base portion is disposed to a rear end of the second tongue portion. The plurality of the first terminals are surrounded by the first insulating body and the second insulating body. Each first terminal has a first contacting portion which is surrounded by the first tongue portion. Top surfaces of the first contacting portions of the plurality of the first terminals are flush with the top surface of the first tongue portion. The plurality of the second terminals are surrounded by the third insulating body. Each second terminal has a second contacting portion. The second contacting portions of the plurality of the second terminals are exposed out of the top surface of the fourth base portion. The metal element is disposed to an outer surface of the insulating housing. The fastening assembly is positioned above the fourth insulating body of the insulating housing.

Another object of the present invention is to provide an electrical connector. The electrical connector includes a connector body, a plurality of first terminals, a plurality of second terminals, a front shell, an inner rotating dish, an elastic element, an outer shell. The connector body includes an insulating housing, and a metal element attached to a front surface, a bottom surface and two opposite side surfaces of the insulating housing. The plurality of the first terminals are positioned in the insulating housing. First contacting portions of the plurality of the first terminals are exposed outside to a top surface of a front end of the connector body. The plurality of the second terminals are positioned in the insulating housing. Second contacting portions of the plurality of the second terminals are exposed outside to a top surface of a rear end of the connector body. The front shell surrounds the rear end of the connector body to define an insertion space between the front shell and the top surface of the rear end of the connector body. The second contacting portions of the plurality of the second terminals are positioned in the insertion space. The front end of the connector body with the first contacting portions of the plurality of the first terminals extends outside from the front shell. A top wall of the front shell defines an insertion groove. The inner rotating dish is positioned on the top wall of the front shell. The inner rotating dish has a fastening pillar. The fastening pillar slides along the insertion groove. The elastic element is disposed to one end of the inner rotating dish, and the elastic element partially abuts against the one end of the inner rotating dish. The outer shell receives the rear end of the connector body, the front shell, the inner rotating dish and the elastic element. The front end of the connector body with the first contacting portions of the plurality of the first terminals extends outside from the outer shell. A top wall of the outer shell defines a first assembling hole. The external rotating dish is positioned on the top wall of the outer shell. The external rotating dish has a docking end. The docking end passes through the first assembling hole, and the docking end is fastened to the inner rotating dish.

Another object of the present invention is to provide an electrical connector. The electrical connector includes an insulating housing, a plurality of first terminals, a plurality of second terminals, a metal element, an inner shell and a fastening assembly. The plurality of the first terminals are mounted in the insulating housing. The plurality of the second terminals are mounted in the insulating housing. The metal element is disposed to an outer surface of the insulating housing. The metal element has a main portion. The main portion has two side walls and a front wall. The front wall is connected with front ends of the two side walls. Bottoms of the front ends of the two side walls and a bottom of a front end of the front wall are connected with a reinforcing portion. The reinforcing portion is disposed to a bottom of the first tongue portion, a bottom of the second tongue portion and a front of the second base portion of the second insulating body. A bottom surface of the reinforcing portion is recessed inward to form a sliding groove. The inner shell surrounds a rear end of the insulating housing. The inner shell includes a front shell, an upper shielding shell and a lower shielding shell. The front shell is mounted around the rear end of the insulating housing and a rear end of the metal element. The upper shielding shell and the lower shielding shell are disposed to a rear end of the front shell. The front shell has an insertion groove. The insertion groove penetrates through a top wall of the front shell. A shape of the insertion groove and a shape of the sliding groove are the same. The fastening assembly is disposed to a top surface of the front shell. The fastening assembly has an external rotating dish, an inner rotating dish and an elastic element. The external rotating dish is disposed on the inner rotating dish. The external rotating dish is fastened to the inner rotating dish. The elastic element is disposed to one end of the inner rotating dish. A bottom surface of the inner rotating dish extends downward to form a fastening pillar. The fastening pillar is slidably disposed in the insertion groove. One side of the inner rotating dish close to the elastic element is arched outward to form an arc portion. The one end of the inner rotating dish has a first concave portion and a first stopping portion which are adjacent to one end of the arc portion. The first concave portion is disposed between the arc portion and the first stopping portion. The one side of the inner rotating dish has a second concave portion and a second stopping portion which are adjacent to the other end of the arc portion. The second concave portion is disposed between the arc portion and the second stopping portion. The elastic element has two fastening ends, a first bending portion and two second bending portions. Two free ends of the elastic element are defined as the two fastening ends. An inner side of each fastening end is arched towards the upper shielding shell to form the second bending portion. Two inner sides of the two second bending portions are arched towards the inner rotating dish and then are connected with each other to form the first bending portion. A front end of the first bending portion is alternatively corresponding to the first concave portion and the second concave portion.

As described above, the electrical connector is able to be docked with the other electrical connector by an innovative structure design, the electrical connector is able to be used as the plug and the socket simultaneously for reducing a manufacturing cost of the electrical connector. Moreover, when a user uses the one electrical connector for docking with the other electrical connector, a usage complexity of the electrical connector is reduced, and a purchasing work hour and the manufacturing cost of the electrical connector are reduced at the time of maintaining and changing the electrical connector. In addition, the metal element reinforces a structure strength of a tongue board of the electrical connector, so the electrical connector has the better structure strength. The fastening assembly is capable of reducing an inner structure space application of the electrical connector by an application of a rotating knob way of the fastening assembly. As a result, the electrical connector is capable of reinforcing the structure strength.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
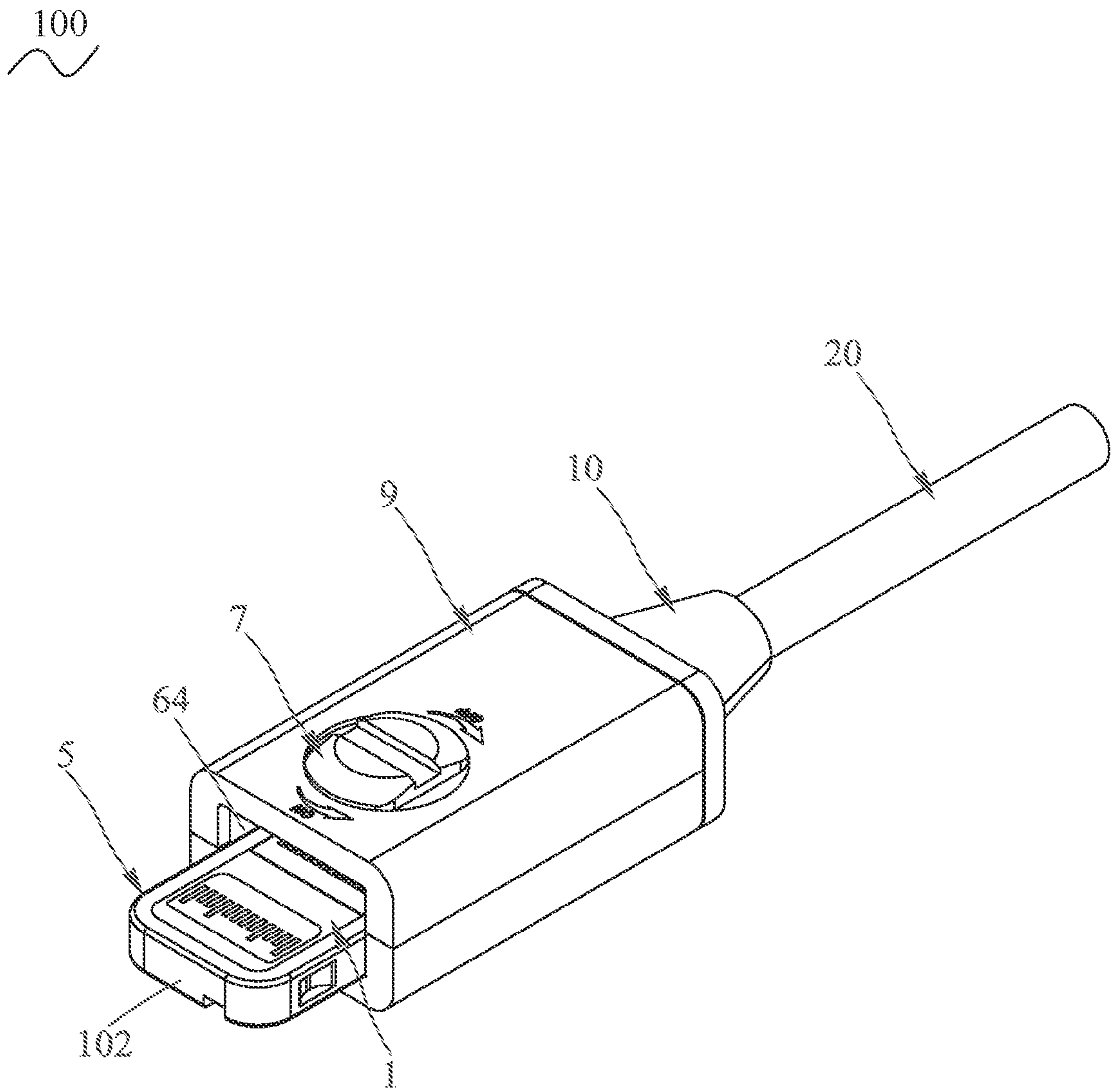
FIG. 1 is a perspective view of an electrical connector in accordance with a preferred embodiment of the present invention.

With reference to FIG. 1 to FIG. 4, an electrical connector 100 in accordance with a preferred embodiment of the present invention is shown. The electrical connector 100 includes an insulating housing 1, a plurality of first terminals 2, a plurality of second terminals 3, a center grounding plate 4, a metal element 5, an inner shell 6, a fastening assembly 7, a circuit board 8, an outer shell 9, a stress releasing element 10 and a cable 20.

The plurality of the first terminals 2, the plurality of the second terminals 3 and the center grounding plate 4 are surrounded by the insulating housing 1. The center grounding plate 4 is disposed between the plurality of the first terminals 2 and the plurality of the second terminals 3. The metal element 5 is disposed to an outer surface of the insulating housing 1. In the preferred embodiment, the metal element 5 is formed by a metal injection molding technology. The inner shell 6 surrounds a rear end of the insulating housing 1. The fastening assembly 7 is disposed to a top surface of the inner shell 6. The circuit board 8 is disposed between rear ends of the plurality of the first terminals 2 and rear ends of the plurality of the second terminals 3. The circuit board 8 is disposed in the inner shell 6. The outer shell 9 surrounds the inner shell 6. A rear end of the inner shell 6 extends out of the outer shell 9. The stress releasing element 10 surrounds the rear end of the inner shell 6. The stress releasing element 10 is disposed to a rear end of the outer shell 9. One end of the cable 20 is connected with the circuit board 8, and the other end of the cable 20 extends out of the stress releasing element 10.

Figure 3:
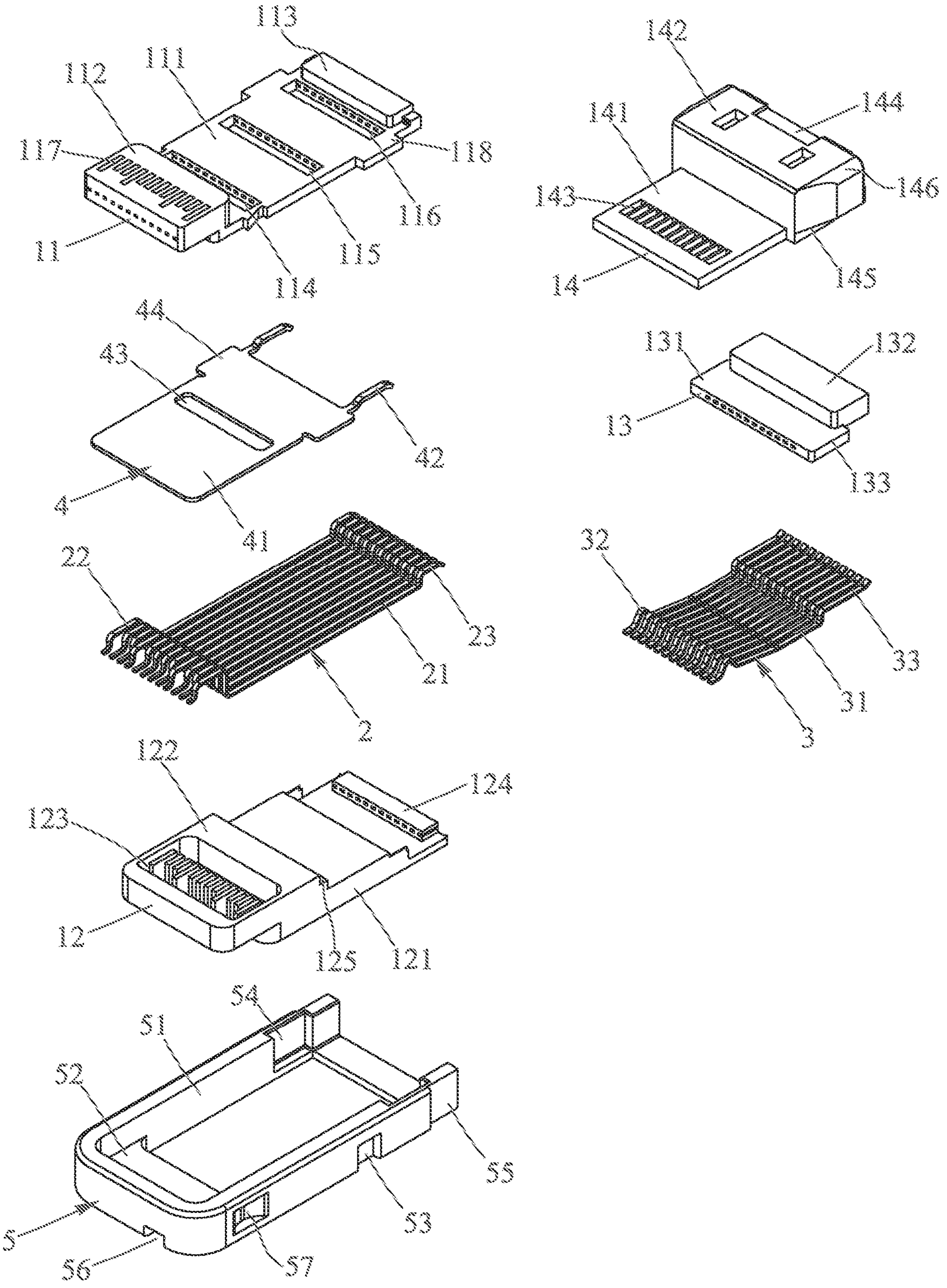
FIG. 3 is a partially exploded view of the electrical connector of FIG. 1.

Referring to FIG. 3, the insulating housing 1 has a first insulating body 11, a second insulating body 12, a third insulating body 13 and a fourth insulating body 14. The first insulating body 11 is surrounded by the second insulating body 12. The third insulating body 13 is disposed to a rear end of a top surface of the first insulating body 11. The fourth insulating body 14 is disposed to a top surface of the third insulating body 13.

The plurality of the first terminals 2 are positioned in the insulating housing 1. The plurality of the first terminals 2 are mounted in the first insulating body 11 of the insulating housing 1. The first insulating body 11 has a first base portion 111, a first tongue portion 112, a first surrounding portion 113, a first penetrating groove 114, a second penetrating groove 115, a third penetrating groove 116, a plurality of first terminal slots 117 and two first blocking portions 118. A front end of the first insulating body 11 has the first tongue portion 112 connected with a front end of the first base portion 111. The front end of the first base portion 111 extends upward and then extends frontward to form the first tongue portion 112. The first tongue portion 112 surrounds a corresponding mechanism of the plurality of the first terminals 2.

A middle of a rear end of the first base portion 111 extends upward to form the first surrounding portion 113. The first surrounding portion 113 surrounds a corresponding structure of the plurality of the first terminals 2. The first penetrating groove 114, the second penetrating groove 115 and the third penetrating groove 116 are sequentially disposed in the first base portion 111 along a front-to-rear direction. The plurality of the first terminal slots 117 penetrate through a top surface and a bottom surface of the first tongue portion 112 of the first insulating body 11. The corresponding mechanisms of the plurality of the first terminals 2 are disposed in the plurality of the first terminal slots 117. Two opposite sides of the rear end of the first base portion 111 extend outward to form the two first blocking portions 118, respectively. The two first blocking portions 118 are blocked in a corresponding mechanism of the metal element 5. The two first blocking portions 118 are fastened in the corresponding mechanism of the metal element 5.

The second insulating body 12 has a second base portion 121, a second tongue portion 122, a second terminal slot 123, a second surrounding portion 124 and a lacking groove 125. A front end of the second insulating body 12 has the second tongue portion 122 connected with a front end of the second base portion 121. The first base portion 111 of the first insulating body 11 is surrounded by the second base portion 121. The second base portion 121 fills up the first penetrating groove 114, the second penetrating groove 115 and the third penetrating groove 116 by an injection molding technology. The front end of the second base portion 121 extends upward and then extends frontward to form the second tongue portion 122. A top surface of the first tongue portion 112 is flush with a top surface of the second tongue portion 122.

The second terminal slot 123 penetrates through the top surface and a bottom surface of the second tongue portion 122 of the second insulating body 12. The first tongue portion 112 is disposed in the second tongue portion 122. The first tongue portion 112 of the first insulating body 11 is disposed in the second terminal slot 123 of the second tongue portion 122 of the second insulating body 12 by the injection molding technology. The second insulating body 12 surrounds the first insulating body 11. The second insulating body 12 surrounds a part of the center grounding plate 4. A middle of a rear end of the second base portion 121 extends upward to form the second surrounding portion 124. The second surrounding portion 124 is filled in the third penetrating groove 116 of the first insulating body 11 by the injection molding technology. A top surface of a rear end of the second tongue portion 122 is recessed downward to form the lacking groove 125 penetrating through a rear surface of the second tongue portion 122. A front end of the fourth insulating body 14 is disposed in the lacking groove 125.

Two opposite sides of the third insulating body 13 and two opposite sides of the fourth insulating body 14 are blocked in a corresponding structure of the metal element 5, and the two opposite sides of the third insulating body 13 and the two opposite sides of the fourth insulating body 14 are fastened to the corresponding structure of the metal element 5, so that the insulating housing 1 is located to the metal element 5, and the insulating housing 1 is fixed to the metal element 5. The third insulating body 13 has a third base portion 131, a first protruding block 132, two second blocking portions 133. The third base portion 131 is located above the rear end of the first base portion 111. A top surface of a rear end of the third base portion 131 extends upward and then extends rearward to form the first protruding block 132. Two opposite sides of the third base portion 131 extend outward to form the two second blocking portions 133, respectively. The first protruding block 132 is disposed on the first surrounding portion 113 of the first insulating body 11. The two second blocking portions 133 are blocked in the corresponding structure of the metal element 5, and the two second blocking portions 133 are fastened in the corresponding structure of the metal element 5.

The fourth insulating body 14 is mounted on the third insulating body 13. The fourth insulating body 14 has a fourth base portion 141, a second protruding block 142, a plurality of third terminal slots 143, a concave surface 144, two third blocking portions 145 and two third protruding blocks 146. The front end of the fourth insulating body 14 has the fourth base portion 141. The fourth base portion 141 is disposed to a rear end of the second tongue portion 122. The fourth base portion 141 is located behind the second tongue portion 122. A rear end of the fourth base portion 141 extends upward and then extends rearward to form the second protruding block 142. A top surface of the fourth base portion 141 is flush with the top surface of the first tongue portion 112 and the top surface of the second tongue portion 122. The plurality of the third terminal slots 143 penetrate through the top surface and a bottom surface of the fourth base portion 141. Corresponding sections of the plurality of the second terminals 3 are disposed in the plurality of the third terminal slots 143. A middle of a top surface of a rear end of the fourth insulating body 14 is recessed downward to form the concave surface 144. A middle of a top surface of a rear end of the second protruding block 142 is recessed downward to form the concave surface 144. A corresponding area of the inner shell 6 is fastened in the concave surface 144, so that the inner shell 6 is located to the insulating housing 1, and the inner shell 6 is fixed to the insulating housing 1.

Two opposite sides of the rear end of the fourth base portion 141 extend outward to form the two third blocking portions 145, respectively. The two third blocking portions 145 are disposed to a bottom surface of the second protruding block 142. The two third blocking portions 145 are blocked to a corresponding configuration of the metal element 5, and the two third blocking portions 145 are fastened to the corresponding configuration of the metal element 5. Two opposite sides of the second protruding block 142 extend outward to form the two third protruding blocks 146, respectively. The two third protruding blocks 146 are disposed to top surfaces of two opposite sides of a rear end of the metal element 5. The two second blocking portions 133 of the third insulating body 13 are disposed above the two first blocking portions 118 of the first insulating body 11. The two third blocking portions 145 are disposed on two top surfaces of the two second blocking portions 133 of the third insulating body 13. A front end of the fourth base portion 141 is disposed in the lacking groove 125 of the second insulating body 12.

In the preferred embodiment, the first tongue portion 112 of the first insulating body 11, the second tongue portion 122 of the second insulating body 12 and a front end of the metal element 5 form a tongue board 102. The plurality of the first terminals 2 are fastened in the tongue board 102. The electrical connector 100 includes a connector body 101. The connector body 101 includes the insulating housing 1 and the metal element 5. The metal element 5 is attached to a front surface, a bottom surface and two opposite side surfaces of the insulating housing 1. A rear end of the connector body 101 is disposed in the outer shell 9. The plurality of the second terminals 3 are fastened to the rear end of the connector body 101. A front end of the connector body 101 projects out of the outer shell 9, and the front end of the connector body 101 forms the tongue board 102. Corresponding positions of the plurality of the first terminals 2 are exposed out of a top surface of the tongue board 102. Corresponding positions of the plurality of the second terminals 3 are exposed out of a top surface of the rear end of the connector body 101, and the corresponding constructions of the plurality of the second terminals 3 are disposed in the outer shell 9.

Figure 2:
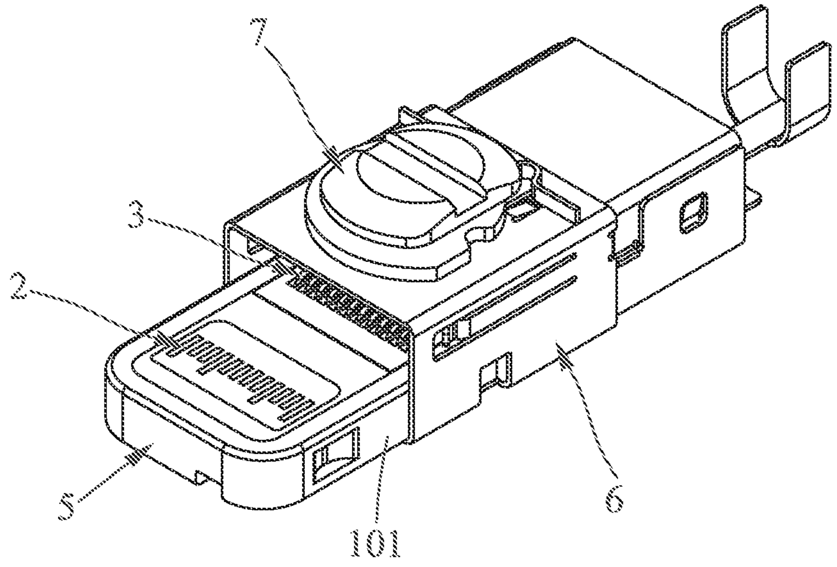
FIG. 2 is a partially perspective view of the electrical connector of FIG. 1.

Referring to FIG. 2 and FIG. 3, the plurality of the first terminals 2 are surrounded by the first insulating body 11 and the second insulating body 12. Each first terminal 2 has a first fastening portion 21, a first contacting portion 22 and a first soldering portion 23. The first fastening portion 21 is an elongated shape. The first fastening portions 21 of the plurality of the first terminals 2 are surrounded by the first base portion 111 of the first insulating body 11. The first fastening portions 21 of the plurality of the first terminals 2 are exposed outside to the first penetrating groove 114, the second penetrating groove 115 and the third penetrating groove 116. A front end of the first fastening portion 21 is bent upward, then extends frontward and is bent downward to form the first contacting portion 22. A tail end of the first contacting portion 22 is bent frontward. The first contacting portion 22 is surrounded by the first tongue portion 112 of the first insulating body 11.

The first contacting portions 22 of the plurality of the first terminals 2 are disposed in the plurality of the first terminal slots 117 of the first insulating body 11. Top surfaces of the first contacting portions 22 of the plurality of the first terminals 2 are exposed outside of tops of the plurality of the first terminal slots 117. The top surfaces of the first contacting portions 22 of the plurality of the first terminals 2 are exposed to the top surface of the first tongue portion 112. In the preferred embodiment, the top surfaces of the first contacting portions 22 of the plurality of the first terminals 2 are flush with the top surface of the first tongue portion 112. The top surfaces of the first contacting portions 22 of the plurality of the first terminals 2 are exposed outside of the top surface of the tongue board 102 through the plurality of the first terminal slots 117. A rear end of the first fastening portion 21 is bent upward and then extends rearward to form the first soldering portion 23. The first soldering portions 23 of the plurality of the first terminals 2 are partially surrounded by the first surrounding portion 113 of the first insulating body 11. The first soldering portions 23 of the plurality of the first terminals 2 extend beyond a rear surface of the rear end of the first insulating body 11. The first soldering portions 23 of the plurality of the first terminals 2 contact a bottom surface of the circuit board 8.

Referring to FIG. 3, the plurality of the second terminals 3 are mounted in the third insulating body 13 of the insulating housing 1. The plurality of the second terminals 3 are positioned in the insulating housing 1. Each second terminal 3 has a second fastening portion 31, a second contacting portion 32 and a second soldering portion 33. The second fastening portion 31 is an inverted Z shape. The second fastening portions 31 of the plurality of the second terminals 3 are surrounded by the third insulating body 13. A front end of the second fastening portion 31 slantwise extends upward and frontward, and then is arched upward to form the second contacting portion 32. The second contacting portions 32 of the plurality of the second terminals 3 extend beyond a front surface of the third insulating body 13 of the insulating housing 1.

The second contacting portions 32 of the plurality of the second terminals 3 are inserted into the plurality of the third terminal slots 143 of the fourth insulating body 14 of the insulating housing 1 from bottoms of the plurality of the third terminal slots 143 of the fourth insulating body 14 of the insulating housing 1. The second contacting portions 32 of the plurality of the second terminals 3 are exposed out of the top surface of the fourth base portion 141 of the fourth insulating body 14. Top surfaces of the second contacting portions 32 of the plurality of the second terminals 3 are exposed out of tops of the plurality of the third terminal slots 143 of the fourth insulating body 14. The second contacting portions 32 of the plurality of the second terminals 3 are exposed outside to the top surface of the rear end of the connector body 101 through the plurality of the third terminal slots 143 of the fourth insulating body 14. The second contacting portions 32 of the plurality of the second terminals 3 are disposed in the inner shell 6 and the outer shell 9. A rear end of the second fastening portion 31 extends rearward to form the second soldering portion 33. The second soldering portions 33 of the plurality of the second terminals 3 are exposed beyond a rear surface of a rear end of the third insulating body 13. The second soldering portions 33 of the plurality of the second terminals 3 contact a top surface of the circuit board 8.

The center grounding plate 4 is disposed to a top surface of the first base portion 111 of the first insulating body 11. The center grounding plate 4 has a base plate 41, two third soldering portions 42, a fourth penetrating groove 43 and two fourth blocking portions 44. Two opposite sides of a rear edge of the base plate 41 extend rearward to form the two third soldering portions 42, respectively. The fourth penetrating groove 43 penetrates through a top surface and a bottom surface of a middle of the base plate 41. The fourth penetrating groove 43 is corresponding to the second penetrating groove 115 of the first insulating body 11. Two opposite sides of a rear end of the base plate 41 extend outward to form the two fourth blocking portions 44, respectively. Each fourth blocking portion 44 is clamped between one first blocking portion 118 of the first insulating body 11 and one second blocking portion 133 of the third insulating body 13. The two first blocking portions 118 of the first insulating body 11, the two second blocking portions 133 of the third insulating body 13, the two third blocking portions 145 and the two fourth blocking portions 44 are blocked in a corresponding location of the metal element 5, and the two first blocking portions 118 of the first insulating body 11, the two second blocking portions 133 of the third insulating body 13, the two third blocking portions 145 and the two fourth blocking portions 44 are fastened in the corresponding location of the metal element 5.

Figure 6:
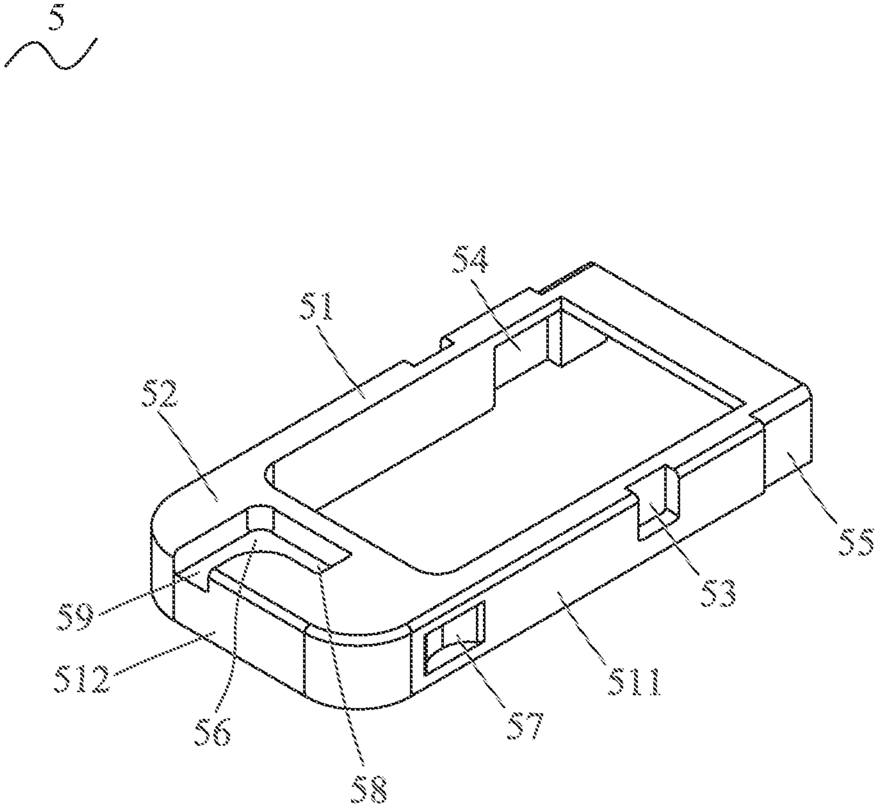
FIG. 6 is a perspective view of a metal element of the electrical connector of FIG. 1.
Figure 7:
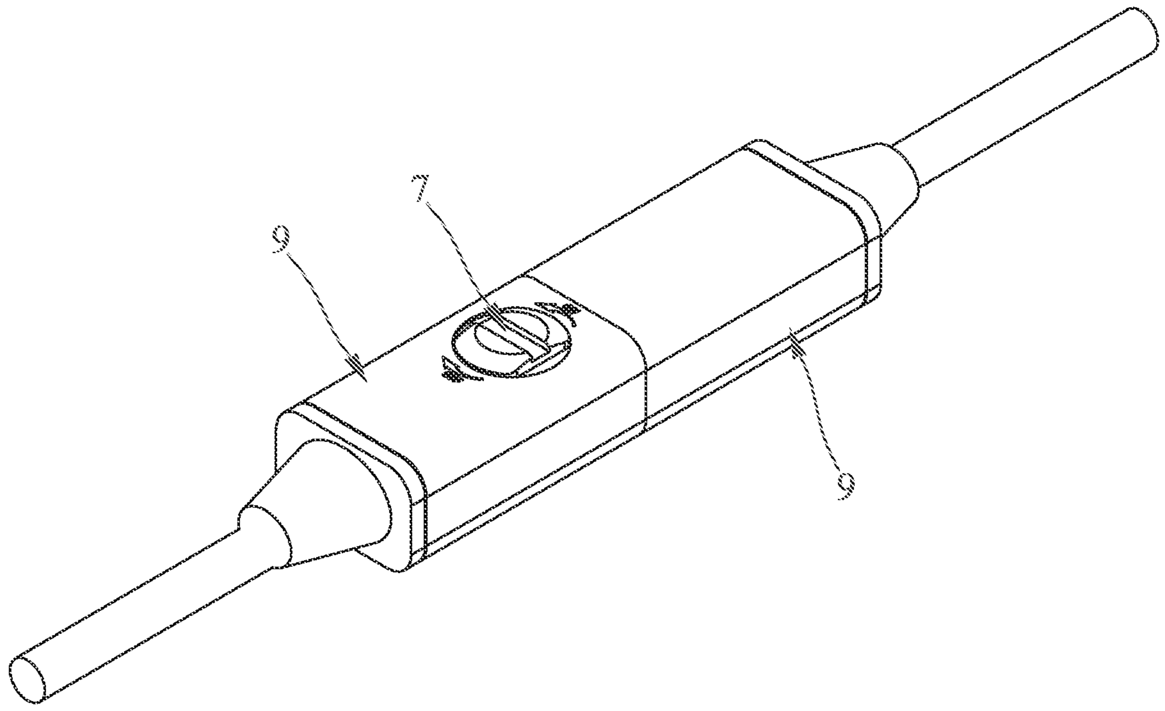
FIG. 7 is a perspective view of the two electrical connectors, wherein the two electrical connectors are assembled with each other.
Figure 8:
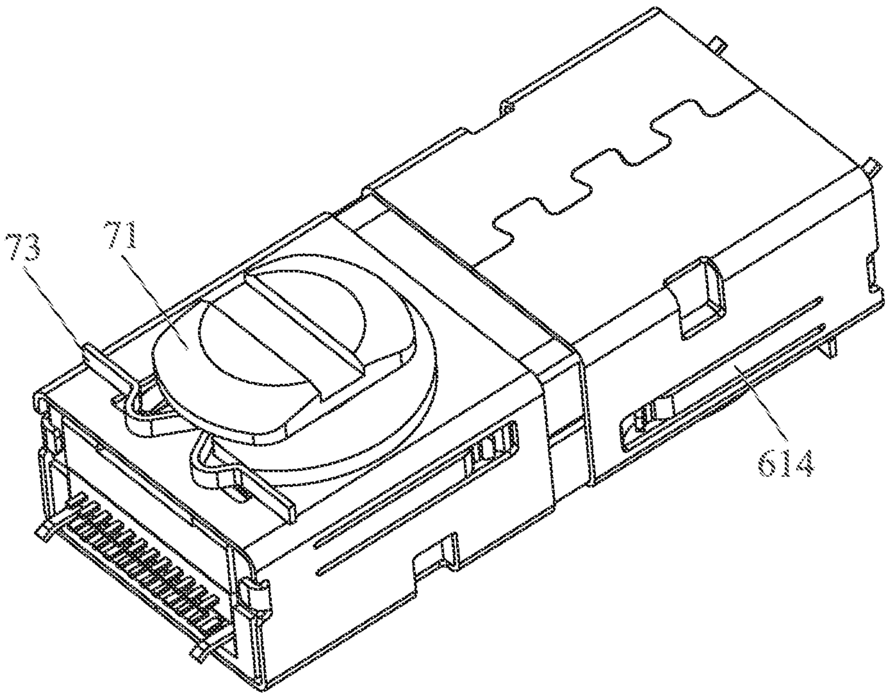
FIG. 8 is a partially perspective view of the two electrical connectors of FIG. 7, wherein the two electrical connectors are assembled with each other.
Figure 9:
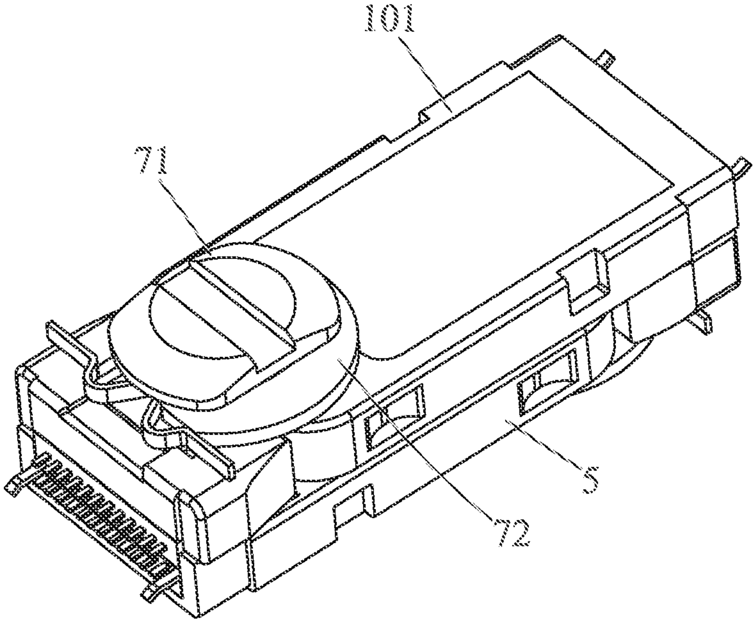
FIG. 9 is another partially perspective view of the two electrical connectors of FIG. 7, wherein the two electrical connectors are assembled with each other, and the two electrical connectors are in a locked state.
Figure 10:
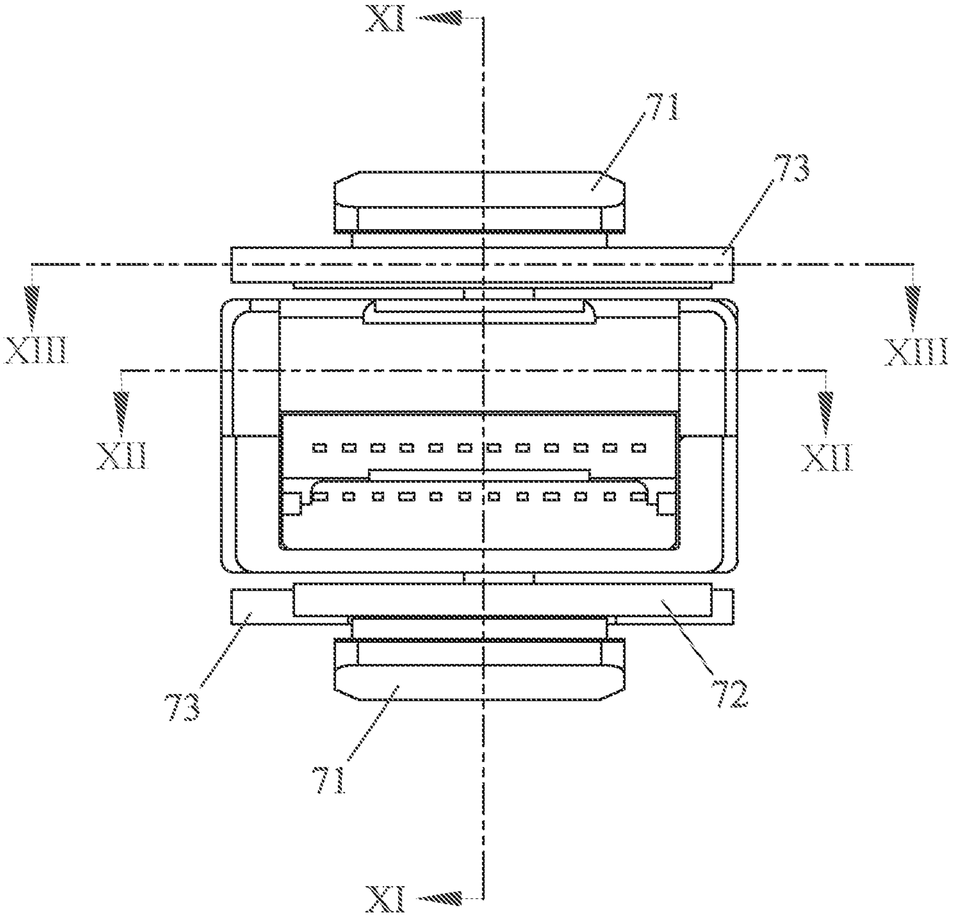
FIG. 10 is a diagrammatic drawing of the two electrical connectors of FIG. 7, wherein the two electrical connectors are assembled with each other, and the two electrical connectors are in the locked state.
Figure 11:
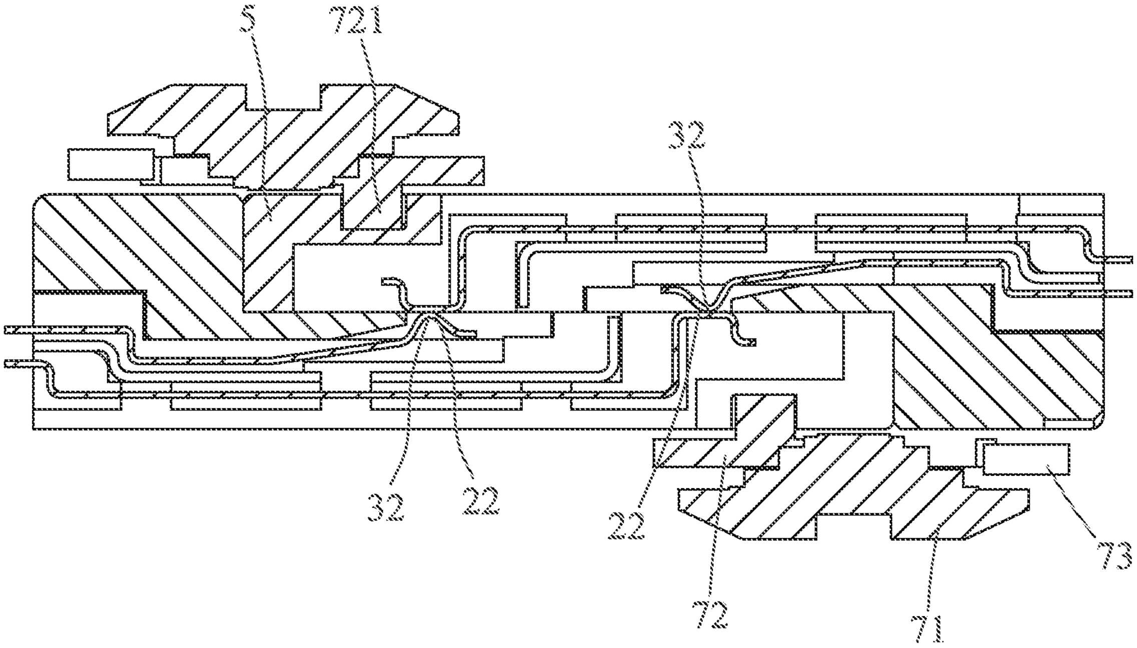
FIG. 11 is a sectional view of the two electrical connectors along a line XI-XI of FIG. 10.
Figure 12:
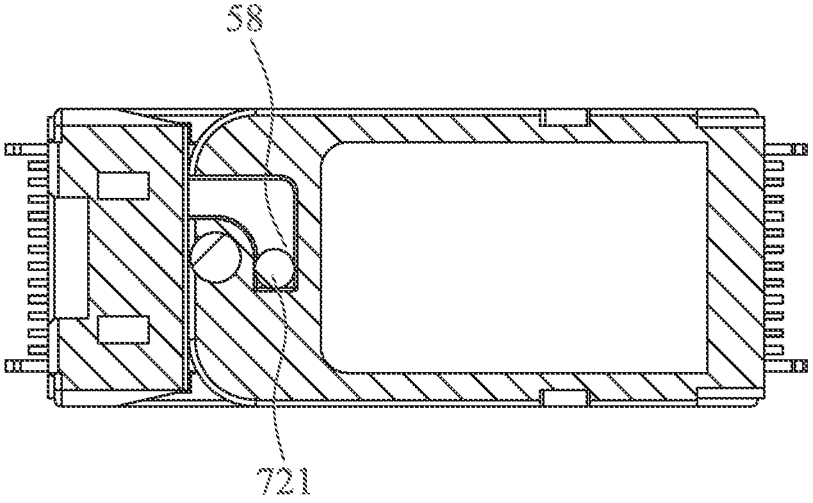
FIG. 12 is a sectional view of the two electrical connectors along a line XII-XII of FIG. 10.
Figure 13:
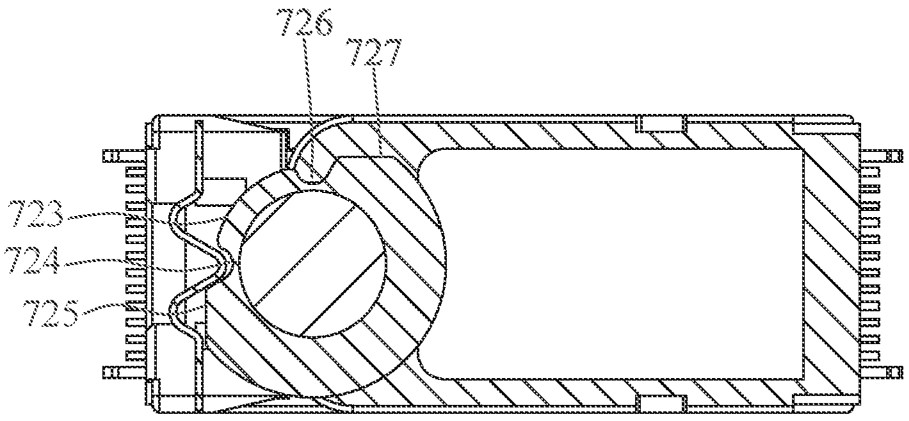
FIG. 13 is a sectional view of the two electrical connectors along a line XIII-XIII of FIG. 10.
Figure 14:
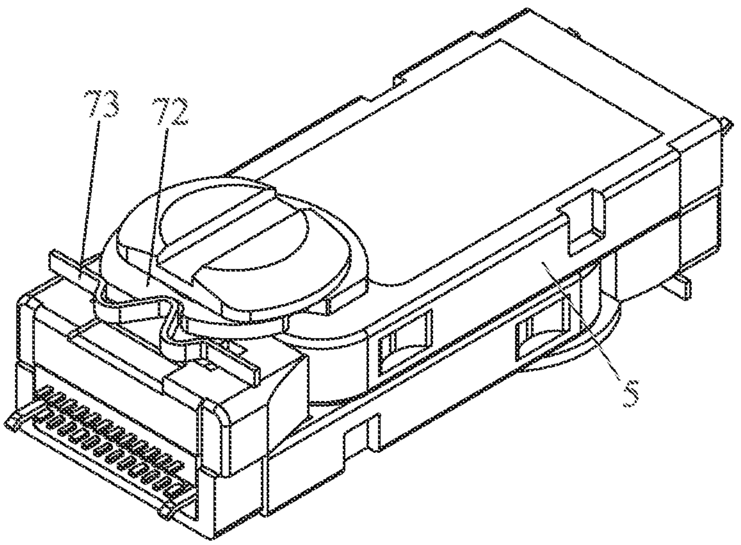
FIG. 14 is a partially perspective view of the two electrical connectors of FIG. 7, wherein the two electrical connectors are assembled with each other, and the two electrical connectors are in an unlocked state.
Figure 15:
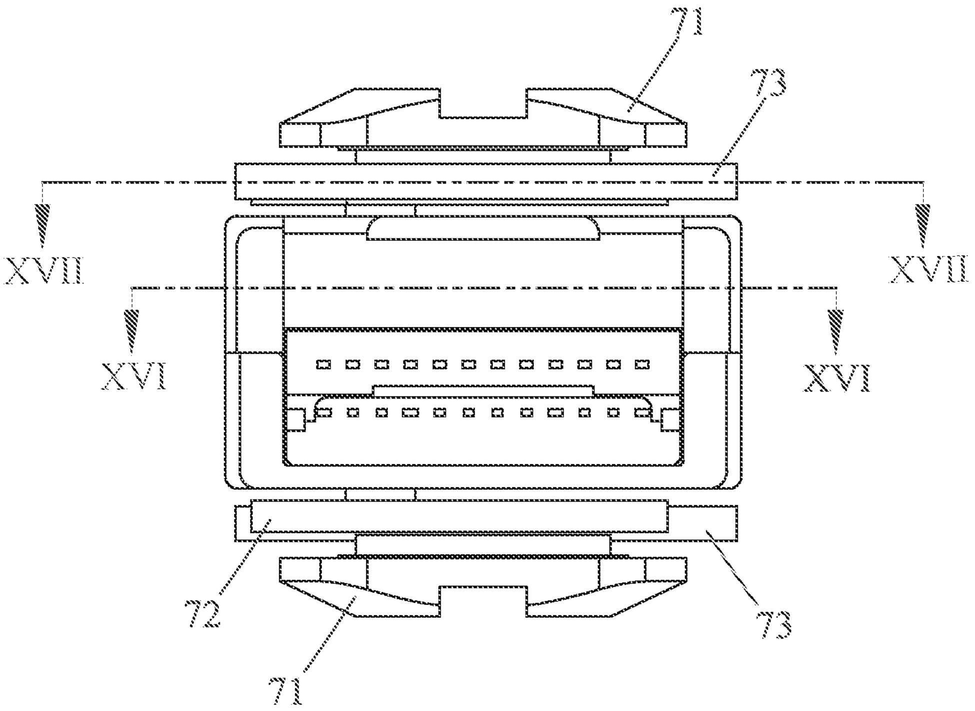
FIG. 15 is a diagrammatic drawing of the two electrical connectors of FIG. 7, wherein the two electrical connectors are assembled with each other, and the two electrical connectors are in the unlocked state.
Figure 16:
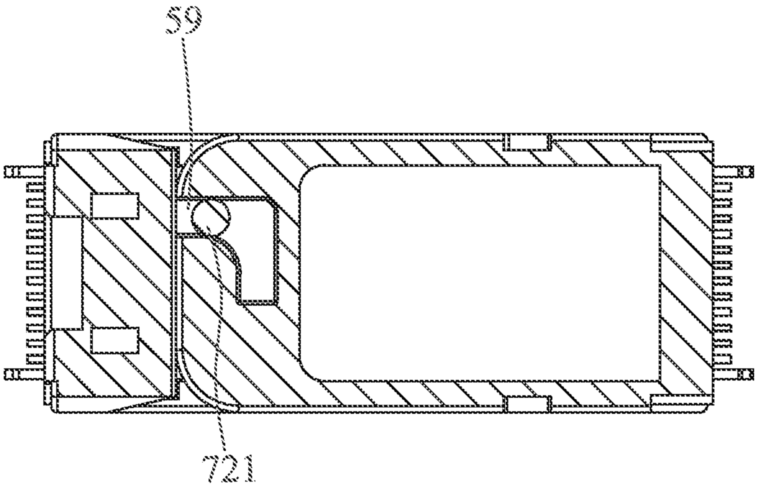
FIG. 16 is a sectional view of the two electrical connectors along a line XVI-XVI of FIG. 15.
Figure 17:
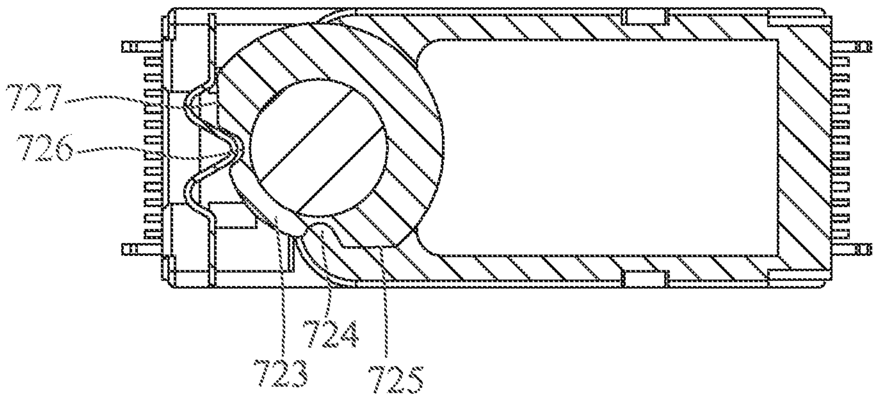
FIG. 17 is a sectional view of the two electrical connectors along a line XVII-XVII of FIG. 15.

Referring to FIG. 3 and FIG. 6, the metal element 5 is disposed to the outer surface of the insulating housing 1. The first contacting portions 22 of the plurality of the first terminals 2 are exposed outside to a top surface of a front end of the connector body 101. The metal element 5 is used for reinforcing the tongue board 102 of the connector body 101. The metal element 5 has a main portion 51, a reinforcing portion 52, a first fastening groove 53, a second fastening groove 54, a third fastening groove 55, a sliding groove 56 and two location portions 57. In the preferred embodiment, the metal element 5 has the main portion 51, the reinforcing portion 52, two first fastening grooves 53, two second fastening grooves 54, two third fastening grooves 55, the sliding groove 56 and two location portions 57.

The main portion 51 reinforces the tongue board 102 of the connector body 101. The main portion 51 has two side walls 511 and a front wall 512. The front wall 512 is connected with front ends of the two side walls 511. Bottoms of the front ends of the two side walls 511 and a bottom of a front end of the front wall 512 are connected with the reinforcing portion 52. The reinforcing portion 52 is disposed to a bottom of the first tongue portion 112 of the first insulating body 11, a bottom of the second tongue portion 122 of the second insulating body 12 and a front of the second base portion 121 of the second insulating body 12. The reinforcing portion 52 reinforces the tongue board 102 of the connector body 101.

Outer surfaces of the two side walls 511 of the main portion 51 are recessed inward to form the two first fastening grooves 53, respectively. The two first fastening grooves 53 are corresponding to two corresponding sections of the inner shell 6. The two first fastening grooves 53 are buckled with two corresponding mechanisms of the outer shell 9, so that the outer shell 9 is located to the metal element 5, and the outer shell 9 is fastened with the metal element 5. Inner surfaces of the two side walls 511 of the main portion 51 are recessed oppositely to form the two second fastening grooves 54, respectively. The two opposite sides of the third insulating body 13 and the two opposite sides of the fourth insulating body 14 are corresponding to the two second fastening grooves 54. The two opposite sides of the third insulating body 13 and the two opposite sides of the fourth insulating body 14 are fastened to the two second fastening grooves 54. The two first blocking portions 118 of the first insulating body 11, the two second blocking portions 133 of the third insulating body 13, the two third blocking portions 145 of the fourth insulating body 14 and the two fourth blocking portions 44 of the center grounding plate 4 are buckled in the two second fastening grooves 54, and the two first blocking portions 118 of the first insulating body 11, the two second blocking portions 133 of the third insulating body 13, the two third blocking portions 145 of the fourth insulating body 14 and the two fourth blocking portions 44 of the center grounding plate 4 are fastened in the two second fastening grooves 54, so that the insulating housing 1 is located in the metal element 5, and the metal element 5 is fastened to the insulating housing 1.

The outer surfaces of the two side walls 511 of the main portion 51 are recessed inward to form the two third fastening grooves 55, respectively. The two third fastening grooves 55 penetrate through a rear surface of the main portion 51. Corresponding mechanisms of the inner shell 6 are fastened in the two third fastening grooves 55, so that the inner shell 6 is located to the metal element 5, and inner shell 6 is fastened to the metal element 5. In the preferred embodiment, the two first fastening grooves 53, the two second fastening grooves 54 and the two third fastening grooves 55 are sequentially disposed at the main portion 51 along the front-to-rear direction. A bottom surface of the reinforcing portion 52 is recessed inward to form the sliding groove 56. In the preferred embodiment, the sliding groove 56 is an L shape structure. One end of the sliding groove 56 penetrates through a front surface of the front wall 512 of the main portion 51 to form an opened end. The other end of the sliding groove 56 forms a closed end. Front ends of the outer surfaces of the two side walls 511 of the main portion 51 are recessed inward to form the two location portions 57.

Figure 4:
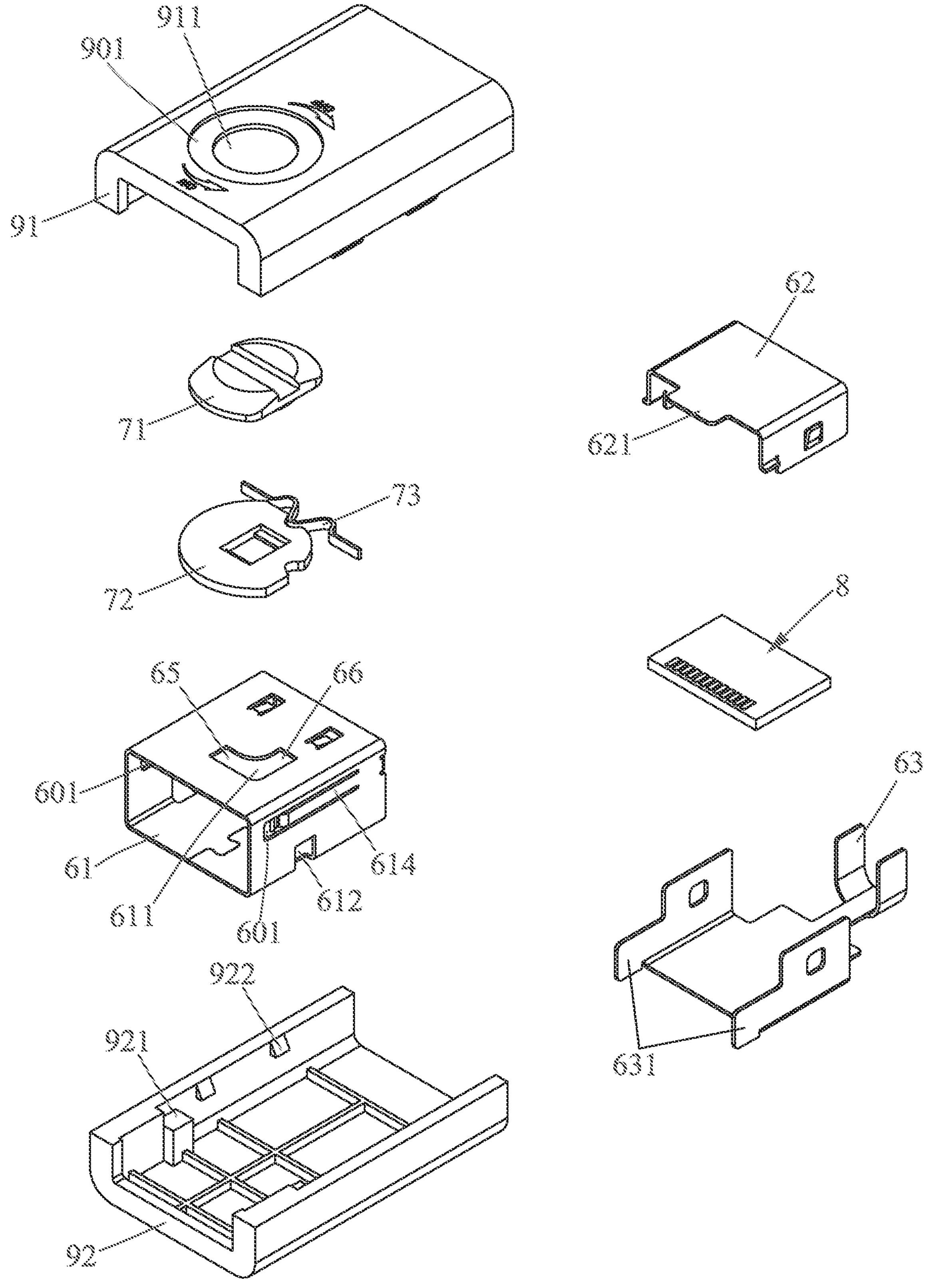
FIG. 4 is a partially exploded view of the electrical connector of FIG. 1.
Figure 5:
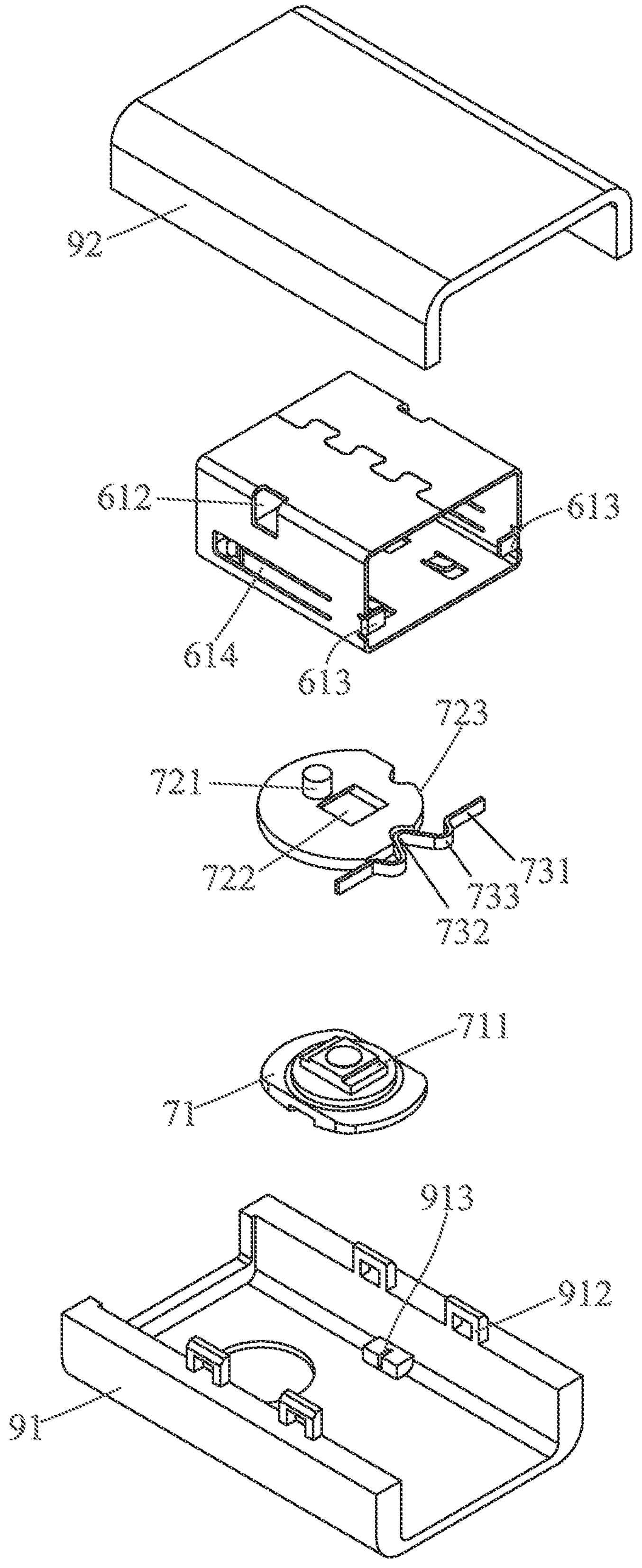
FIG. 5 is another partially exploded view of the electrical connector of FIG. 1.

Referring to FIG. 1, FIG. 4 and FIG. 5, the inner shell 6 includes a front shell 61, an upper shielding shell 62 and a lower shielding shell 63. The inner shell 6 is a hollow shape. The inner shell 6 has an insertion space 64. The front shell 61 is mounted around the rear end of the insulating housing 1 and a rear end of the metal element 5. The front shell 61 is mounted around the rear end of the connector body 101. The upper shielding shell 62 and the lower shielding shell 63 are disposed to a rear end of the front shell 61. The upper shielding shell 62 is disposed to a top surface of the rear end of the front shell 61. The lower shielding shell 63 is disposed to a bottom surface of the rear end of the front shell 61. The circuit board 8 is disposed between the upper shielding shell 62 and the lower shielding shell 63. The upper shielding shell 62 is fastened to the lower shielding shell 63. A front end of the inner shell 6 forms the insertion space 64. The front shell 61 surrounds the rear end of the connector body 101 to define the insertion space 64 between the front shell 61 and the top surface of the rear end of the connector body 101. A front of a top surface of the rear end of the connector body 101 is spaced from the front shell 61 of the inner shell 6 to form the insertion space 64 between the front shell 61 and the front of the top surface of the rear end of the connector body 101. The front end of the connector body 101 extends beyond a front end of the front shell 61 of the inner shell 6 to form the tongue board 102. The second contacting portions 32 of the plurality of the second terminals 3 are positioned in the insertion space 64. The front end of the connector body 101 with the first contacting portions 22 of the plurality of the first terminals 2 extending outside from the front shell 61.

The front shell 61 has an insertion groove 611, an assembling groove 612, a blocking wall 613 and two elastic arms 614. In the preferred embodiment, the front shell 61 has the insertion groove 611, two assembling grooves 612, two blocking walls 613 and two elastic arms 614. A top wall of the front shell 61 defines the insertion groove 611. The insertion groove 611 penetrates through the top wall of the front shell 61. In the preferred embodiment, the insertion groove 611 is the L shape structure. A shape of the insertion groove 611 and a shape of the sliding groove 56 are the same. A corresponding mechanism of the fastening assembly 7 is disposed in the insertion groove 611. The two assembling grooves 612 penetrate through two opposite side surfaces and a bottom surface of the front shell 61. The two assembling grooves 612 are corresponding to the two first fastening grooves 53 of the metal element 5. Corresponding mechanisms of the outer shell 9 are buckled with the two assembling grooves 612, so that the outer shell 9 is located to the inner shell 6, and the outer shell 9 is fastened to the inner shell 6. Two opposite sides of the rear end of the front shell 61 are bent towards each other to form the two blocking walls 613. The two blocking walls 613 abut against two opposite sides of a rear surface of the second protruding block 142 of the fourth insulating body 14 of the insulating housing 1. Two opposite sides of the front shell 61 define two rectangular perforations 601. Two rear inner walls of the two perforations 601 extend frontward and then are arched inward to form the two elastic arms 614.

A middle of a front edge of a top of the upper shielding shell 62 extends frontward to form a first protruding portion 621. The first protruding portion 621 is fastened in the concave surface 144 of the fourth insulating body 14 of the insulating housing 1, so that the inner shell 6 is located to the insulating housing 1, and the inner shell 6 is fastened to the insulating housing 1. Two front ends of two opposite sides of the lower shielding shell 63 extend frontward to form two second protruding portions 631. The two second protruding portions 631 are fastened in the two third fastening grooves 55 of the metal element 5 to realize that the inner shell 6 is located to the metal element 5, and the inner shell 6 is fastened to the metal element 5.

Referring to FIG. 1 to FIG. 6, the closed end of the sliding groove 56 is defined as a backstop portion 58, and the opened end of the sliding groove 56 is defined as an opening 59. The opening 59 penetrates through the front surface of the front wall 512. One end of the insertion groove 611 is defined as a first position 65, and the other end of the insertion groove 611 is defined as a second position 66. The corresponding mechanism of the fastening assembly 7 moves between the first position 65 and the second position 66.

Referring to FIG. 2, FIG. 3, FIG. 4, FIG. 5 and FIG. 13, the fastening assembly 7 is disposed to a top surface of the front shell 61 of the inner shell 6. The fastening assembly 7 is positioned above the fourth insulating body 14 of the insulating housing 1. The fastening assembly 7 has an external rotating dish 71, an inner rotating dish 72 and an elastic element 73. The external rotating dish 71 is disposed on the inner rotating dish 72. The external rotating dish 71 is fastened to the inner rotating dish 72. The elastic element 73 is disposed to one end of the inner rotating dish 72, and the elastic element 73 partially abuts against the one end of the inner rotating dish 72. In the preferred embodiment, the elastic element 73 is disposed to a rear end of the inner rotating dish 72. A bottom surface of the external rotating dish 71 extends downward to form a docking end 711. The docking end 711 is fastened in a corresponding mechanism of the inner rotating dish 72 to realize that the external rotating dish 71 is located to the inner rotating dish 72, and the external rotating dish 71 is fastened to the inner rotating dish 72. In the preferred embodiment, the fastening assembly 7 is made of a metal material. The outer shell 9 receives the rear end of the connector body 101, the front shell 61, the inner rotating dish 72 and the elastic element 73. The front end of the connector body 101 with the first contacting portions 22 of the plurality of the first terminals 2 extending outside from the outer shell 9.

The inner rotating dish 72 is positioned on the top wall of the front shell 61. The inner rotating dish 72 has a fastening pillar 721, a docking hole 722, an arc portion 723, a first concave portion 724, a first stopping portion 725, a second concave portion 726 and a second stopping portion 727. A bottom surface of the inner rotating dish 72 extends downward to form the fastening pillar 721. The fastening pillar 721 slides along the insertion groove 611. The fastening pillar 721 is slidably disposed in the insertion groove 611 of the front shell 61 of the inner shell 6. The inner rotating dish 72 defines the docking hole 722 penetrating through middles of a top surface and the bottom surface of the inner rotating dish 72. The docking end 711 of the external rotating dish 71 is fastened in the docking hole 722 to realize that the external rotating dish 71 is located to the inner rotating dish 72, and the external rotating dish 71 is fixed to the inner rotating dish 72. A rear of one side of the inner rotating dish 72 close to the elastic element 73 is arched outward to form the arc portion 723. When the electrical connector 100 is changed between a locked state and an unlocked state, a user rotates the external rotating dish 71 to drive the inner rotating dish 72 to rotate. At the moment, the arc portion 723 abuts against the elastic element 73.

When two electrical connectors 100 are docked with each other, the sliding groove 56 of one electrical connector 100 is corresponding to the insertion groove 611 of the other electrical connector 100. The backstop portion 58 and the opening 59 of the sliding groove 56 of the one electrical connector 100 are corresponding to the first position 65 and the second position 66 of the insertion groove 611 of the other electrical connector 100, respectively. The backstop portion 58 and the opening 59 of the sliding groove 56 of the one electrical connector 100 are corresponding to the first position 65 and the second position 66 of the insertion groove 611 of the other electrical connector 100, respectively. The fastening pillar 721 of the inner rotating dish 72 of the one electrical connector 100 moves between the first position 65 and the second position 66 along the insertion groove 611, the fastening pillar 721 of the inner rotating dish 72 of the one electrical connector 100 moves between the backstop portion 58 of the metal element 5 of the other electrical connector 100 and the opening 59 of the metal element 5 of the other electrical connector 100 along the sliding groove 56 of the metal element 5 of the other electrical connector 100.

The one end of the inner rotating dish 72 has the first concave portion 724 and the first stopping portion 725 which are adjacent to one end of the arc portion 723. The first concave portion 724 is adjacent to the arc portion 723. The first concave portion 724 is disposed between the arc portion 723 and the first stopping portion 725. The first concave portion 724 is buckled with a corresponding mechanism of the elastic element 73. The first stopping portion 725 abuts against the corresponding mechanism of the elastic element 73. The one side of the inner rotating dish 72 has the second concave portion 726 and the second stopping portion 727 which are adjacent to the other end of the arc portion 723. The second concave portion 726 is adjacent to the arc portion 723. The arc portion 723 is located between the first concave portion 724 and the second concave portion 726. A middle of a rear surface of the rear end of the inner rotating dish 72 is recessed inward to form the second concave portion 726. The second concave portion 726 is disposed between the arc portion 723 and the second stopping portion 727. The second concave portion 726 is buckled with the corresponding mechanism of the elastic element 73. The second stopping portion 727 abuts against the corresponding mechanism of the elastic element 73. In the preferred embodiment, the inner rotating dish 72 is a circle plate. The second concave portion 726 and the first concave portion 724 are disposed to two opposite ends of the arc portion 723. The second concave portion 726 and the first concave portion 724 are disposed at two different places of a circular outer periphery of the inner rotating dish 72. The second concave portion 726 and the first concave portion 724 are separated by ninety degrees.

The elastic element 73 has two fastening ends 731, a first bending portion 732 and two second bending portions 733. Two free ends of the elastic element 73 are defined as the two fastening ends 731. The two fastening ends 731 are fastened in a corresponding mechanism of the outer shell 9 to realize that the elastic element 73 is located to the outer shell 9, and the elastic element 73 is fastened to the outer shell 9. An inner side of each fastening end 731 is arched towards the upper shielding shell 62 to form the second bending portion 733. Two inner sides of the two second bending portions 733 are arched towards the inner rotating dish 72 and then are connected with each other to form the first bending portion 732. The first bending portion 732 is a substantially V shape. A mouth of the first bending portion 732 faces rearward. A front end of the first bending portion 732 is alternatively corresponding to the first concave portion 724 and the second concave portion 726. The first bending portion 732 is buckled with the first concave portion 724 or the second concave portion 726 to realize that the elastic element 73 is located to the inner rotating dish 72, and the elastic element 73 is fastened to the inner rotating dish 72. In the preferred embodiment, an arching direction of the first bending portion 732 and an arching direction of each second bending portion 733 are opposite. The first bending portion 732 and the two second bending portions 733 form a W shape structure seen from a vertical view.

Referring to FIG. 4 and FIG. 5, the outer shell 9 includes an upper outer shell 91 and a lower outer shell 92. The upper outer shell 91 is disposed to a top surface of the fastening assembly 7, the top surface of the front shell 61 and a top surface of the upper shielding shell 62. The lower outer shell 92 is disposed to a bottom surface of the metal element 5, the bottom surface of the front shell 61 and a bottom surface of the lower shielding shell 63. A top wall of the outer shell 9 defines a first assembling hole 911. The upper outer shell 91 has the first assembling hole 911, a plurality of second assembling holes 912 and two inserting slots 913. The first assembling hole 911 penetrates through a top surface and a bottom surface of the upper outer shell 91. An inner portion of a top surface of a peripheral wall of the first assembling hole 911 is recessed downward to form a ring-shaped supporting surface 901. The supporting surface 901 surrounds the first assembling hole 911.

The external rotating dish 71 is positioned on the top wall of the outer shell 9. The external rotating dish has a docking end 711. The docking end 711 passes through the first assembling hole 911, and the docking end 711 is fastened to the inner rotating dish 72. The external rotating dish 71 of the fastening assembly 7 is disposed to a top surface of the upper outer shell 91. The external rotating dish 71 of the fastening assembly 7 is attached to the supporting surface 901. The external rotating dish 71 of the fastening assembly 7 covers the first assembling hole 911. The docking end 711 of the external rotating dish 71 penetrates through the first assembling hole 911 of the upper outer shell 91, and then the docking end 711 of the external rotating dish 71 is buckled in the docking hole 722 of the inner rotating dish 72. The external rotating dish 71 is exposed out of the top surface of the upper outer shell 91. Two opposite sides of the upper outer shell 91 form the plurality of the second assembling holes 912. The plurality of the second assembling holes 912 are corresponding to corresponding mechanisms of the lower outer shell 92 to realize that the upper outer shell 91 is located to the lower outer shell 92, and the upper outer shell 91 is fixed to the lower outer shell 92. Two inner surfaces of the two opposite sides of the upper outer shell 91 have the two inserting slots 913. The two fastening ends 731 of the elastic element 73 of the fastening assembly 7 are disposed in the two inserting slots 913 to realize that the fastening assembly 7 is located to the outer shell 9, and the fastening assembly 7 is fastened to the outer shell 9.

Referring to FIG. 3 to FIG. 5, an inner surface of the lower outer shell 92 has a protruding rib 921 and a plurality of buckling portions 922. In the preferred embodiment, the lower outer shell 92 has two protruding ribs 921. Two inner surfaces of two opposite sides of the lower outer shell 92 extend inward to form the two protruding ribs 921. The two protruding ribs 921 are corresponding to the two first fastening grooves 53 of the metal element 5 and the two assembling grooves 612 of the front shell 61 of the inner shell 6 to realize that the outer shell 9 is located to the metal element 5 and the inner shell 6, and the outer shell 9 is fastened to the metal element 5 and the inner shell 6. Several portions of the two inner surfaces of the two opposite sides of the lower outer shell 92 protrude inward to form the plurality of the buckling portions 922. The plurality of the buckling portions 922 are corresponding to the plurality of the second assembling holes 912 of the upper outer shell 91. The plurality of the buckling portions 922 are fastened in the plurality of the second assembling holes 912 of the upper outer shell 91 to realize that the lower outer shell 92 is located to the upper outer shell 91, and the lower outer shell 92 is fastened to the upper outer shell 91.

Referring to FIG. 3 to FIG. 14, when the two electrical connectors 100 are connected with each other, the two electrical connectors 100 are oriented oppositely along an up-down direction, and the two electrical connectors 100 are in two opposite states. The two tongue boards 102 of the two electrical connectors 100 are mutually inserted into the insertion spaces 64 of the two electrical connectors 100. The first contacting portions 22 of the plurality of the first terminals 2 of the one electrical connector 100 are contacted with the second contacting portions 32 of the plurality of the second terminals 3 of the other electrical connector 100. The first contacting portions 22 of the plurality of the first terminals 2 of the one electrical connector 100 are conductive with the second contacting portions 32 of the plurality of the second terminals 3 of the other electrical connector 100. The two elastic arms 614 of the front shell 61 of the inner shell 6 of the one electrical connector 100 is buckled with the two location portions 57 of the metal element 5 of the other electrical connector 100. The fastening pillar 721 of the fastening assembly 7 of the one electrical connector 100 is slidably disposed in the sliding groove 56 of the metal element 5 of the other electrical connector 100. A front surface of the metal element 5 of the one electrical connector 100 abuts against a front surface of the second protruding block 142 of the fourth insulating body 14 of the insulating housing 1 of the other electrical connector 100.

Referring to FIG. 4 to FIG. 17, when the two electrical connectors 100 are docked with each other, and the two electrical connectors 100 are in the locked states, the first concave portion 724 of the inner rotating dish 72 is buckled with the first bending portion 732 of the elastic element 73. The first stopping portion 725 of the inner rotating dish 72 abuts against one fastening end 731 of the elastic element 73. At the moment, the fastening pillar 721 of the inner rotating dish 72 is located at the first position 65. The fastening pillar 721 of the inner rotating dish 72 of the one electrical connector 100 is located at the backstop portion 58 of the metal element 5 of the other electrical connector 100.

When the two electrical connectors 100 are docked with each other, and the two electrical connectors 100 are changed from the locked states to the unlocked states, the user rotates the external rotating dish 71. The docking end 711 of the external rotating dish 71 drives the inner rotating dish 72 to rotate. At the moment, the first concave portion 724 of the inner rotating dish 72 separates from the first bending portion 732 of the elastic element 73. The arc portion 723 of the inner rotating dish 72 abuts against the first bending portion 732 of the elastic element 73. The first bending portion 732 of the elastic element 73 slides along the arc portion 723 of the inner rotating dish 72 and then is buckled with the second concave portion 726 of the inner rotating dish 72. The second stopping portion 727 of the inner rotating dish 72 abuts against the other fastening end 731 of the elastic element 73. At the same time, the fastening pillar 721 of the inner rotating dish 72 of the one electrical connector 100 moves from the first position 65 to the second position 66 along the insertion groove 611 of the inner shell 6. The fastening pillar 721 of the inner rotating dish 72 of the one electrical connector 100 moves from the backstop portion 58 of the metal element 5 of the other electrical connector 100 to the opening 59 of the metal element 5 of the other electrical connector 100 along the sliding groove 56 of the metal element 5 of the other electrical connector 100. The first bending portion 732 and each second bending portion 733 have elastic deforming forces and elastic restoring forces, so that the inner rotating dish 72 is fastened to the elastic element 73. The electrical connector 100 is maintained in the locked state or the unlocked state.

When the two electrical connectors 100 are in the unlocked states, the second concave portion 726 of the inner rotating dish 72 is buckled with the first bending portion 732 of the elastic element 73. The second stopping portion 727 abuts against the other fastening end 731 of the elastic element 73. At the moment, the fastening pillar 721 of the inner rotating dish 72 is located at the second position 66 of the front shell 61 of the inner shell 6. The fastening pillar 721 of the inner rotating dish 72 of the one electrical connector 100 is located at the opening 59 of the metal element 5 of the other electrical connector 100.

As described above, the electrical connector 100 is able to be docked with the other electrical connector 100 by an innovative structure design, the electrical connector 100 is able to be used as a plug and a socket simultaneously for reducing a manufacturing cost of the electrical connector 100. Moreover, when the user uses the one electrical connector 100 for docking with the other electrical connector 100, a usage complexity of the electrical connector 100 is reduced, and a purchasing work hour and the manufacturing cost of the electrical connector 100 are reduced at the time of maintaining and changing the electrical connector 100. In addition, the metal element 5 reinforces a structure strength of the tongue board 102 of the electrical connector 100, so the electrical connector 100 has a better structure strength. The fastening assembly 7 is capable of reducing an inner structure space application of the electrical connector 100 by an application of a rotating knob way of the fastening assembly 7. As a result, the electrical connector 100 is capable of reinforcing the structure strength.

What is claimed is:

1. An electrical connector, comprising:

an insulating housing having:

- a first insulating body having a first base portion, and a first tongue portion connected with a front end of the first base portion;
- a second insulating body surrounding the first insulating body, the second insulating body having a second base portion, and a second tongue portion connected with a front end of the second base portion, the first tongue portion being disposed in the second tongue portion;
- a third insulating body disposed to a rear end of a top surface of the first insulating body, the third insulating body having a third base portion, the third base portion being located above a rear end of the first base portion; and
- a fourth insulating body, disposed to a top surface of the third insulating body, a front end of the fourth insulating body having a fourth base portion, a top surface of the fourth base portion being flush with a top surface of the first tongue portion and a top surface of the second tongue portion, the fourth base portion being disposed to a rear end of the second tongue portion;

a plurality of first terminals surrounded by the first insulating body and the second insulating body, each first terminal having a first contacting portion which is surrounded by the first tongue portion, top surfaces of the first contacting portions of the plurality of the first terminals being flush with the top surface of the first tongue portion;

a plurality of second terminals surrounded by the third insulating body, each second terminal having a second contacting portion, the second contacting portions of the plurality of the second terminals being exposed out of the top surface of the fourth base portion;

a metal element disposed to an outer surface of the insulating housing; and a fastening assembly positioned above the fourth insulating body of the insulating housing.

2. The electrical connector as claimed in claim 1, wherein the first insulating body has a plurality of first terminal slots penetrating through the top surface and a bottom surface of the first tongue portion of the first insulating body, the first contacting portions of the plurality of the first terminals are disposed in the plurality of the first terminal slots, top surfaces of the first contacting portions of the plurality of the first terminals are exposed outside of tops of the plurality of the first terminal slots, the second insulating body has a second terminal slot penetrating through the top surface and a bottom surface of the second tongue portion of the second insulating body, the first tongue portion is disposed in the second terminal slot, the fourth insulating body has a plurality of third terminal slots penetrating through the top surface and a bottom surface of the fourth base portion, the second contacting portions of the plurality of the second terminals are inserted into the plurality of the third terminal slots, top surfaces of the second contacting portions of the plurality of the second terminals are exposed out of tops of the plurality of the third terminal slots of the fourth insulating body.

3. The electrical connector as claimed in claim 1, wherein the metal element has a main portion, the main portion has two side walls and a front wall, the front wall is connected with front ends of the two side walls, bottoms of the front ends of the two side walls and a bottom of a front end of the front wall are connected with a reinforcing portion, the reinforcing portion is disposed to a bottom of the first tongue portion of the first insulating body, a bottom of the second tongue portion of the second insulating body and a front of the second base portion of the second insulating body.

4. The electrical connector as claimed in claim 3, wherein a bottom surface of the reinforcing portion is recessed inward to form a sliding groove, the sliding groove is an L shape structure, one end of the sliding groove penetrates through a front surface of the front wall of the main portion to form an opened end, the other end of the sliding groove forms a closed end.

5. The electrical connector as claimed in claim 4, further comprising an inner shell, the inner shell surrounding a rear end of the insulating housing, the inner shell including a front shell, an upper shielding shell and a lower shielding shell, the front shell being mounted around the rear end of the insulating housing and a rear end of the metal element, the upper shielding shell and the lower shielding shell being disposed to a rear end of the front shell, the front shell having an insertion groove, the insertion groove penetrating through a top wall of the front shell, the insertion groove being the L shape structure, a shape of the insertion groove and a shape of the sliding groove being the same.

6. The electrical connector as claimed in claim 5, wherein the fastening assembly is disposed to a top surface of the front shell, the fastening assembly has an external rotating dish, an inner rotating dish and an elastic element, the external rotating dish is disposed on the inner rotating dish, the external rotating dish is fastened to the inner rotating dish, the elastic element is disposed to a rear end of the inner rotating dish.

7. The electrical connector as claimed in claim 6, wherein a bottom surface of the inner rotating dish extends downward to form a fastening pillar, the fastening pillar is disposed in the insertion groove of the front shell of the inner shell, the fastening pillar slides along the insertion groove of the front shell of the inner shell.

8. The electrical connector as claimed in claim 6, wherein one side of the inner rotating dish close to the elastic element is arched outward to form an arc portion, one end of the inner rotating dish has a first concave portion and a first stopping portion which are adjacent to one end of the arc portion, the first concave portion is disposed between the arc portion and the first stopping portion, the one side of the inner rotating dish has a second concave portion and a second stopping portion which are adjacent to the other end of the arc portion, the second concave portion is disposed between the arc portion and the second stopping portion, the second concave portion and the first concave portion are disposed to two opposite ends of the arc portion, the second concave portion and the first concave portion are disposed at two different places of a circular outer periphery of the inner rotating dish.

9. The electrical connector as claimed in claim 8, wherein the elastic element has two fastening ends, a first bending portion and two second bending portions, two free ends of the elastic element are defined as the two fastening ends, an inner side of each fastening end is arched towards the upper shielding shell to form the second bending portion, two inner sides of the two second bending portions are arched towards the inner rotating dish and then are connected with each other to form the first bending portion, a front end of the first bending portion is alternatively corresponding to the first concave portion and the second concave portion.

10. The electrical connector as claimed in claim 9, wherein an arching direction of the first bending portion and an arching direction of each second bending portion are opposite, the first bending portion and the two second bending portions form a W shape structure.

11. The electrical connector as claimed in claim 6, wherein a bottom surface of the external rotating dish extends downward to form a docking end, the inner rotating dish defines a docking hole penetrating through middles of a top surface and a bottom surface of the inner rotating dish, the docking end of the external rotating dish is fastened in the docking hole.

12. The electrical connector as claimed in claim 5, wherein outer surfaces of the two side walls of the main portion are recessed inward to form two first fastening grooves, respectively, the front shell has two assembling grooves penetrating through two opposite side surfaces and a bottom surface of the front shell, the two assembling grooves are corresponding to the two first fastening grooves.

13. The electrical connector as claimed in claim 12, wherein inner surfaces of the two side walls of the main portion are recessed oppositely to form two second fastening grooves, respectively, two opposite sides of the third insulating body and two opposite sides of the fourth insulating body are corresponding to the two second fastening grooves.

14. The electrical connector as claimed in claim 13, wherein the outer surfaces of the two side walls of the main portion are recessed inward to form two third fastening grooves, respectively, a middle of a top surface of a rear end of the fourth insulating body is recessed downward to form a concave surface, a middle of a front edge of a top of the upper shielding shell extends frontward to form a first protruding portion, the first protruding portion is fastened in the concave surface, two front ends of two opposite sides of the lower shielding shell extend frontward to form two second protruding portions, the two second protruding portions are fastened in the two third fastening grooves, the two first fastening grooves, the two second fastening grooves and the two third fastening grooves are sequentially disposed at the main portion along a front-to-rear direction.

15. The electrical connector as claimed in claim 9, further comprising an outer shell surrounding the inner shell, a rear end of the inner shell extending out of the outer shell, the outer shell including an upper outer shell and a lower outer shell, the upper outer shell being disposed to a top surface of the fastening assembly, the top surface of the front shell and a top surface of the upper shielding shell, the lower outer shell being disposed to a bottom surface of the metal element, a bottom surface of the front shell and a bottom surface of the lower shielding shell, the upper outer shell having a first assembling hole and two inserting slots, the first assembling hole penetrating through a top surface and a bottom surface of the upper outer shell, the external rotating dish being disposed to a top surface of the upper outer shell, the external rotating dish covering the first assembling hole, two inner surfaces of two opposite sides of the upper outer shell having the two inserting slots, the two fastening ends being disposed in the two inserting slots.

16. The electrical connector as claimed in claim 15, wherein two opposite sides of the upper outer shell form a plurality of second assembling holes, several portions of the two inner surfaces of the two opposite sides of the lower outer shell protrude inward to form a plurality of buckling portions, the plurality of the buckling portions are fastened in the plurality of the second assembling holes of the upper outer shell.

17. An electrical connector, comprising:

- a connector body including an insulating housing, and a metal element attached to a front surface, a bottom surface and two opposite side surfaces of the insulating housing;
- a plurality of first terminals positioned in the insulating housing, first contacting portions of the plurality of the first terminals being exposed outside to a top surface of a front end of the connector body;
- a plurality of second terminals positioned in the insulating housing, second contacting portions of the plurality of the second terminals being exposed outside to a top surface of a rear end of the connector body;
- a front shell surrounding the rear end of the connector body to define an insertion space between the front shell and the top surface of the rear end of the connector body, the second contacting portions of the plurality of the second terminals being positioned in the insertion space, the front end of the connector body with the first contacting portions of the plurality of the first terminals extending outside from the front shell, a top wall of the front shell defining an insertion groove;
- an inner rotating dish positioned on the top wall of the front shell, the inner rotating dish having a fastening pillar, the fastening pillar sliding along the insertion groove;
- an elastic element disposed to one end of the inner rotating dish, and the elastic element partially abutting against the one end of the inner rotating dish;
- an outer shell receiving the rear end of the connector body, the front shell, the inner rotating dish and the elastic element, the front end of the connector body with the first contacting portions of the plurality of the first terminals extending outside from the outer shell, a top wall of the outer shell defining a first assembling hole; and
- an external rotating dish positioned on the top wall of the outer shell, the external rotating dish having a docking end, the docking end passing through the first assembling hole, and the docking end being fastened to the inner rotating dish.

18. An electrical connector, comprising:

- an insulating housing;
- a plurality of first terminals mounted in the insulating housing;
- a plurality of second terminals mounted in the insulating housing;
- a metal element disposed to an outer surface of the insulating housing, the metal element having a main portion, the main portion having two side walls and a front wall, the front wall being connected with front ends of the two side walls, bottoms of the front ends of the two side walls and a bottom of a front end of the front wall being connected with a reinforcing portion, the reinforcing portion being disposed to a bottom of the first tongue portion, a bottom of the second tongue portion and a front of the second base portion of the second insulating body, a bottom surface of the reinforcing portion being recessed inward to form a sliding groove;
- an inner shell surrounding a rear end of the insulating housing, the inner shell including a front shell, an upper shielding shell and a lower shielding shell, the front shell being mounted around the rear end of the insulating housing and a rear end of the metal element, the upper shielding shell and the lower shielding shell being disposed to a rear end of the front shell, the front shell having an insertion groove, the insertion groove penetrating through a top wall of the front shell, a shape of the insertion groove and a shape of the sliding groove being the same; and
- a fastening assembly disposed to a top surface of the front shell, the fastening assembly having an external rotating dish, an inner rotating dish and an elastic element, the external rotating dish being disposed on the inner rotating dish, the external rotating dish being fastened to the inner rotating dish, the elastic element being disposed to one end of the inner rotating dish, a bottom surface of the inner rotating dish extending downward to form a fastening pillar, the fastening pillar being slidably disposed in the insertion groove, one side of the inner rotating dish close to the elastic element being arched outward to form an arc portion, the one end of the inner rotating dish having a first concave portion and a first stopping portion which are adjacent to one end of the arc portion, the first concave portion being disposed between the arc portion and the first stopping portion, the one side of the inner rotating dish having a second concave portion and a second stopping portion which are adjacent to the other end of the arc portion, the second concave portion being disposed between the arc portion and the second stopping portion, the elastic element having two fastening ends, a first bending portion and two second bending portions, two free ends of the elastic element being defined as the two fastening ends, an inner side of each fastening end being arched towards the upper shielding shell to form the second bending portion, two inner sides of the two second bending portions being arched towards the inner rotating dish and then being connected with each other to form the first bending portion, a front end of the first bending portion being alternatively corresponding to the first concave portion and the second concave portion.

19. The electrical connector as claimed in claim 18, wherein one end of the insertion groove is defined as a first position, and the other end of the insertion groove is defined as a second position, one end of the sliding groove penetrates through a front surface of the front wall of the main portion to form an opened end, the other end of the sliding groove forms a closed end, the closed end of the sliding groove is defined as a backstop portion, and the opened end of the sliding groove is defined as an opening, when two electrical connectors are docked with each other, the sliding groove of one electrical connector is corresponding to the insertion groove of the other electrical connector, the backstop portion and the opening of the sliding groove of the one electrical connector are corresponding to the first position and the second position of the insertion groove of the other electrical connector, respectively, the fastening pillar of the inner rotating dish of the one electrical connector moves between the first position and the second position along the insertion groove, the fastening pillar of the inner rotating dish of the one electrical connector moves between the backstop portion of the metal element of the other electrical connector and the opening of the metal element of the other electrical connector along the sliding groove of the metal element of the other electrical connector.

20. The electrical connector as claimed in claim 18, wherein the second concave portion and the first concave portion are separated by ninety degrees.

* * * * *